United States Patent
Bhide et al.

(10) Patent No.: US 9,542,461 B2
(45) Date of Patent: *Jan. 10, 2017

(54) ENHANCING PERFORMANCE OF EXTRACT, TRANSFORM, AND LOAD (ETL) JOBS

(71) Applicant: International Business Machines Corporation, Armonk, NY (US)

(72) Inventors: Manish A. Bhide, Hyderabad (IN); Krishna K. Bonagiri, Hyderabad (IN); Srinivas K. Mittapalli, Hyderabad (IN); Sumit Negi, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 442 days.

This patent is subject to a terminal disclaimer.

(21) Appl. No.: 13/624,273

(22) Filed: Sep. 21, 2012

(65) Prior Publication Data

US 2014/0089251 A1    Mar. 27, 2014

(51) Int. Cl.
*G06F 17/30*    (2006.01)

(52) U.S. Cl.
CPC .............. *G06F 17/30563* (2013.01)

(58) Field of Classification Search
USPC ...................................... 707/602
See application file for complete search history.

(56) References Cited

U.S. PATENT DOCUMENTS

| 6,208,990 | B1 | 3/2001 | Suresh et al. | |
| 8,095,508 | B2 | 1/2012 | Chamberlain et al. | |
| 2005/0154627 | A1* | 7/2005 | Zuzek et al. | 705/10 |
| 2006/0235899 | A1* | 10/2006 | Tucker | 707/200 |
| 2007/0073941 | A1* | 3/2007 | Brink et al. | 710/68 |
| 2008/0147673 | A1* | 6/2008 | Candea et al. | 707/10 |
| 2008/0162521 | A1* | 7/2008 | Browning | G06F 21/6227 |
| 2008/0168082 | A1* | 7/2008 | Jin et al. | 707/102 |
| 2008/0270369 | A1* | 10/2008 | Myerson et al. | 707/4 |
| 2009/0055439 | A1* | 2/2009 | Pai et al. | 707/200 |
| 2009/0171889 | A1* | 7/2009 | Friedlander et al. | 707/2 |
| 2009/0276449 | A1 | 11/2009 | Syed et al. | |

(Continued)

OTHER PUBLICATIONS

U.S. Appl. No. 13/895,392, entitled "Enhancing Peformance of Extract, Transform, and Load (ETL) Jobs" filed May 16, 2013.

(Continued)

*Primary Examiner* — Kevin L Young
(74) *Attorney, Agent, or Firm* — Alexander G. Jochym

(57) ABSTRACT

A computer receives one or more files having configuration information that includes data that defines a plurality of stages of an extract, transform, and load (ETL) job, wherein the plurality of stages comprise a read stage that is preceded by a write stage, and wherein the read stage reads data from a source location, and wherein the data that is read or a modified version of the data that is read is being written by the write stage that writes data to the source location. The computer replaces the read stage with a decompressor stage. The computer replaces the write stage with a compressor stage. The computer executes the decompressor stage and compressor stage on a field-programmable gate array that is programmatically customized with data compression and data decompression functionality to enhance the performance of the ETL job.

16 Claims, 7 Drawing Sheets

(56) References Cited

U.S. PATENT DOCUMENTS

| | | | |
|---|---|---|---|
| 2009/0281985 A1* | 11/2009 | Aggarwal | 707/2 |
| 2010/0082532 A1* | 4/2010 | Shaik et al. | 707/609 |
| 2010/0223244 A1* | 9/2010 | Sinha | G06Q 10/00 707/705 |
| 2010/0281004 A1* | 11/2010 | Kapoor et al. | 707/693 |
| 2011/0047525 A1 | 2/2011 | Castellanos et al. | |
| 2011/0072319 A1 | 3/2011 | Agarwal et al. | |
| 2012/0265726 A1* | 10/2012 | Padmanabhan et al. | 707/602 |
| 2012/0284587 A1* | 11/2012 | Yu | G06F 3/0608 714/773 |

OTHER PUBLICATIONS

Disclosed Anonymously; "Method of Embed Resume Capability in an ETL Environment"; IP.com Prior Art Database; IPCOM000200909D; Published Oct. 29, 2010; <http://priorartdatabase.com/IPCOM/0002009096>.

Burleson; "Oracle Data Warehousing Tips"; BC Burleson Consulting; Printed Jul. 3, 2012; <http://www.dba-oracle.com/art_dbazine_oracle_10g_data_warehouse.htm>; May 2005.

Christiansen; "How to Use Data Compression"; the bi backend—timeXtender: Agile ETL and data warehousing software; Printed Jul. 3, 2012; <http://thebibackend.wordpress.com/2011/07/30/how-to-use-data-compression>; Jul. 30, 2011.

Morris; "The TeradataForum";—Teradata Compression (V2R4); printed Jul. 3, 2012; <http://www.teradataforum.com/1020829a.htm>.

\* cited by examiner

ENHANCING PERFORMANCE OF EXTRACT, TRANSFORM, AND LOAD (ETL) JOBS

BACKGROUND

1. Field of the Invention

The present invention relates generally to enhancing performance of an extract, transform, and load (ETL) job, and more particularly to accelerating read stages and write stages of the ETL job utilizing a computer program configured to interact with a field-programmable gate array having data compression and data decompression functionality.

2. Description of the Related Art

An ETL job consists of database operations that extract data from various data sources, processes the data, and stores the data at a target location such as a centralized data repository. Particularly, the ETL job includes a sequence of database operations, and each of the operations can be referred to as a stage. The ETL job can have bottlenecks that occur as a result of data processing being performed by the ETL job. Specifically, bottlenecks can occur in response to the ETL job reading data from a file during a read stage, because a subsequent stage that needs to process the data (e.g., perform a computation on the data) may need to wait for the data to be read by the read stage. In addition, bottlenecks can occur in response to the ETL job reading data from a file during the read stage, because the read stage may have to wait for a previous write stage to write the data to the file. Bottlenecks within an ETL job can reduce the overall performance of the ETL job. Thus, the challenge of enhancing performance of an ETL job by minimizing the impact of bottlenecks within the ETL job continues to persist.

SUMMARY

Aspects of an embodiment of the present invention disclose a method, computer system, and program product for accelerating a read stage and a write stage of an extract, transform, and load job. A computer receives one or more files having configuration information that includes data that defines a plurality of stages of at least one extract, transform, and load (ETL) job, wherein the plurality of stages comprise a read stage that is preceded by a write stage, and wherein the read stage reads data from a source location, and wherein the data that is read or a modified version of the data that is read is being written by the write stage that writes data to the source location. The computer identifies the read stage and the write stage within the one or more files, wherein the read stage and write stage each have a first parameter that represents a name of a stage, and wherein the first parameter is associated with a second parameter that represents a type of stage. The computer replaces the read stage with a decompressor stage that reads data from a hard disk, decompresses the data from the hard disk and passes the data that is decompressed to another stage or to a computer program for further processing, wherein the decompressor stage is configured to be executed on a field-programmable gate array (FPGA). The computer replaces the write stage with a compressor stage that compresses the data, and writes the data to a hard disk, wherein the compressor stage is configured to be executed on the FPGA. The computer executes the decompressor stage and the compressor stage on the FPGA.

BRIEF DESCRIPTION OF THE SEVERAL VIEWS OF THE DRAWINGS

The subject matter which is regarded as an embodiment of the present invention is particularly pointed out and distinctly claimed in the claims at the conclusion of the specification. One manner in which recited features of an embodiment of the present invention can be understood is by reference to the following detailed description of embodiments, taken in conjunction with the accompanying drawings in which:

DETAILED DESCRIPTION

Figure 1:
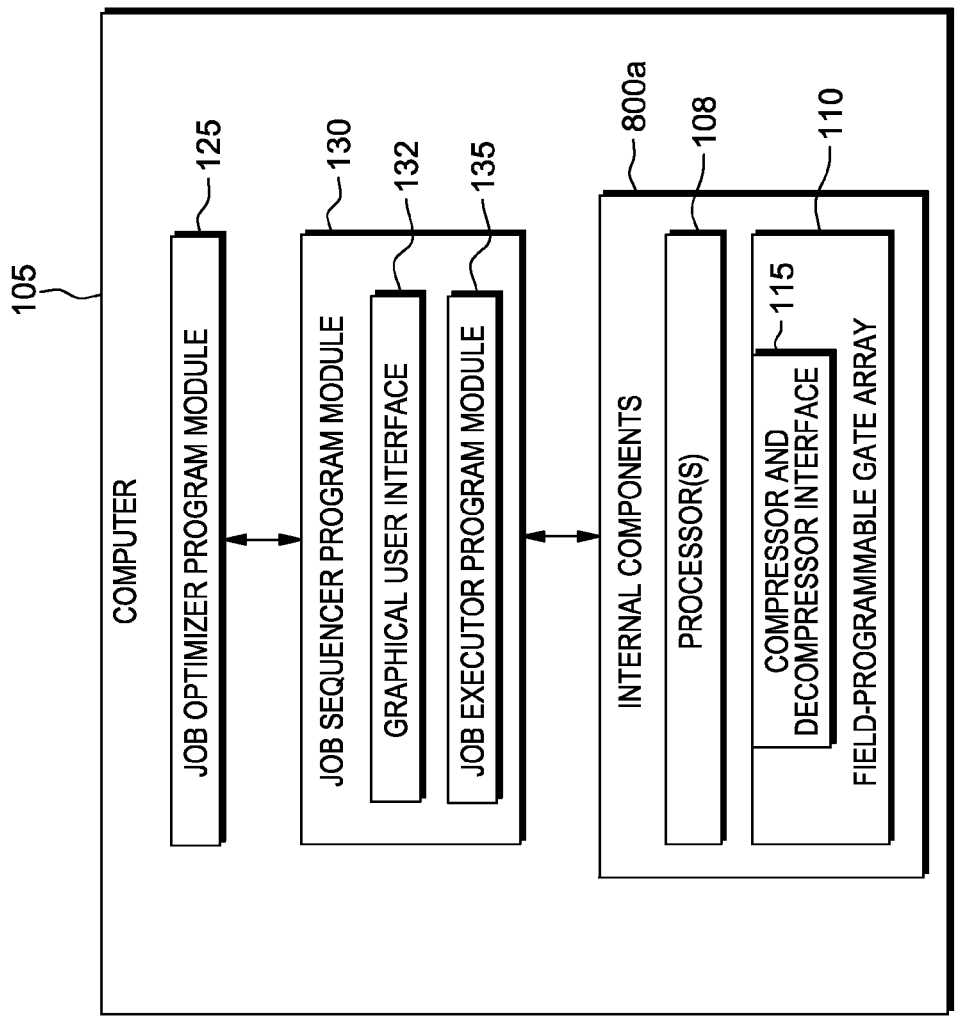
FIG. 1 is a block diagram of a system having a computer that is utilizing computer program code that includes a job optimizer program module, a job sequencer program module, and a job executor program module, wherein the job executor program module is configured to interact with a field-programmable gate array (FPGA) having data compression and data decompression functionality according to an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA, Smalltalk, C++ or the like, conventional procedural programming languages such as the "C" programming language, a hardware description language such as VERILOG, or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Exemplary embodiments now will be described more fully herein with reference to the accompanying drawings. This disclosure may, however, be embodied in many different forms and should not be construed as limited to the exemplary embodiments set forth herein. Rather, these exemplary embodiments are provided so that this disclosure will be thorough and complete, and will fully convey the scope of this disclosure to those skilled in the art. In the description, details of well-known features and techniques may be omitted to avoid unnecessarily obscuring the presented embodiments.

Embodiments of the present invention provide computer program code configured to interact with a field-programmable gate array (FPGA) having data compression and data decompression functionality, which can enhance the performance of an extract, transform, and load (ETL) job. The computer program code identifies a read stage and a write stage of the ETL job, wherein the read stage is reading data being written by a previous write stage. Specifically, the read stage performs a read operation to read data from a source location, and the write stage performs a write operation to write data to a target location, wherein the target location of the write stage may be the source location of the read stage. Subsequent to identifying a read stage that is reading data being written by a previous write stage of the ETL job, as mentioned above, the computer program code replaces the read stage and the write stage with a decompressor stage and a compressor stage, respectively. The compressor stage includes operations to read data, buffer the data, compress the data, and write the data to a hard disk. The decompressor stage includes operations to read the data from the hard disk and decompress the data (e.g., decompress the data into a set of rows within a database table or a file). Also, the decompressor stage includes operations to pass the data that is decompressed to another stage of the same ETL job or any other computer program code for further processing.

Moreover, the decompressor stage and compressor stage are configured to be executed by utilizing the FPGA, which can enhance the performance of the ETL job. Specifically, configurations associated with the decompressor stage include setting parameters that define the decompressor stage, to allow execution of the decompressor stage using the FPGA. In addition, configurations associated with the compressor stage include setting parameters that define the compressor stage to allow execution of the compressor stage using the FPGA. In response to the computer program code identifying the parameters that define the decompressor stage and the compressor stage, the computer program code generates instructions (i.e., additional computer program code) that can execute the decompressor stage and/or a compressor stage on the FPGA. The parameters within the decompressor stage and the compressor stage can be set by a system programmer/administrator via a graphical user interface of the computer program code.

FIG. 1 illustrates system 100 that includes computer 105. In the disclosed embodiment, computer 105 executes computer program code that includes job optimizer program module 125 and job sequencer program module 130. Job sequencer program module 130 includes graphical user interface (GUI) 132 and job executor program module 135. In other embodiments, job optimizer program module 125, job sequencer program module 130, and job executor program module 135 can be designed as a single software application (i.e., computer program code) having program modules that execute within system 100 on one or more computers. Thus, not all program modules may be on a single computer. In addition, computer 105 includes internal components 800a, wherein 800a includes one or more processors 108 and FPGA 110 having compression and decompression interface 115, as described below in more detail with respect to FIG. 7.

In the disclosed embodiment, FPGA 110 having compression and decompression interface 115 can interact with job executor program module 135 to execute compression operations and/or decompression operations of an ETL job, on data processed by the ETL job. Specifically, the compression operations and/or decompression operations on the data processed by the ETL job can be executed utilizing hardware resources of FPGA 110, wherein the hardware resources (i.e., hardware logic structures) of FPGA 110 are programmatically customized to perform data compression and data decompression to enhance the performance of the ETL job. Specifically, the programmatic customizations on FPGA 110 can include configuring connections between hardware logic gates of FPGA 110 to provide optimal performance for compression and decompression of data processed by the ETL job. A variety of compression algorithms may be used by FPGA 110 to achieve a suitable data compression ratio, because generally compression and decompression algorithms implemented on FPGA 110 perform at a superior level than when implemented on one or more processors 108. Some examples of compression and decompression algorithms that may be utilized by FPGA 110 include Huffman coding, LZ77, LZ78, or variations thereof. Accordingly, based on the programmatic customizations on FPGA 110 and by utilizing the compression and decompression algorithms mentioned above, compression and decompression of data can be performed faster on FPGA 110 than on one or more processors 108.

Furthermore, the ETL job or even a sequence of ETL jobs referred to as a job sequence, can process data (i.e., perform operations on data), and can be configured by an end-user via GUI 132 of job sequencer program module 130. Particularly, in the disclosed embodiment, the ETL job can be configured by utilizing GUI 132 of job sequencer program module 130 to add various stages to the ETL job, wherein each stage has a stage name associated with a stage type in which one or more data operations associated with the stage type may be performed during each of the stages. Thus, stage type is a parameter that can be used to define the type of data operations performed by a particular stage. Specifically, the stages of the ETL job can include a read stage having a read stage type that is associated with data read operations, and a write stage having a write stage type that is associated with data write operations. The stages of the ETL job can also include a join stage having a join stage type that is associated with database join operations, an extract stage having an extract stage type that is associated with database extract operations, and a compute stage having a compute stage type that is associated with data compute operations and data comparison operations.

The data read operations can read data from a source location, the data write operations can write data to a target location, the join operations can combine two or more database tables in a database into a single table, the extract operations can extract data from a database table, the compute operations can perform one or more mathematical calculations (e.g., addition, subtraction, multiplication, and division) on the data extracted from the database table, and the comparison operations can perform comparisons between the data extracted from the database table. Moreover, other stage types include a compressor stage type that is associated with data compression operations, and a decompressor stage type that is associated with data decompression operations.

In addition, GUI 132 of job sequencer program module 130 allows the end-user to not only perform configurations to add various stages to the ETL job, but also to delete or modify one or more stages of the ETL job. The modifications can include setting various parameters that define the stages and are needed for executing the ETL job, configuring computational logic in scenarios where the ETL job includes computations with data, enabling functionality for transforming data that is read and/or written in scenarios where the ETL job includes a read and/or write stage, and enabling functionality for updating the join tables or join keys in scenarios where the ETL job includes a join stage. In addition, the end-user can also utilize GUI 132 of job sequencer program module 130 to configure the ETL job to interact with either one or more other ETL jobs, a computer program, or a computer hardware device (e.g., FPGA 110) for purposes of data processing. The data processing can include data compression and/or data decompression to enhance performance of the ETL job.

In response to the end-user utilizing GUI 132 of job sequencer program module 130 to configure the ETL job, job sequencer program module 130 can generate a file having configuration information. The configuration information includes data in the file that defines each stage of the ETL job. Each stage has a stage name associated with a stage type, wherein the stage name and the stage type are defined by the data in the file. Moreover, the data in the file that defines each stage is in a specific format expected by job executor program module 135, wherein the specific format can allow job optimizer program module 125 to efficiently parse the file. An example of the specific format of the file having configuration information is described below in more detail with respect to FIG. 5.

Subsequent to job sequencer program module 130 generating the file having configuration information, job optimizer program module 125 can parse the file to identify an ETL job having a read stage (i.e., identify an ETL job stage having a stage type equal to read) that is reading data being written by a previous write stage (i.e., identify an ETL job stage having a stage type equal to write), replace the write stage with a compressor stage having the compressor stage type, and replace the read stage with a decompressor stage having the decompressor stage type. A compressor stage includes operations to read data, buffer the data, compress the data, and write the data to a hard disk. A decompressor stage includes operations to read data from the hard disk and decompress the data (e.g., decompress the data into a set of rows of a database table and/or file).

Furthermore, job executor program module 135 includes instructions that can execute a compressor stage and/or a decompressor stage on FPGA 110. Particularly, job sequencer program module 130 can call job executor program module 135 to execute an ETL job that was configured by the end-user via GUI 132. Job executor program module 135 includes computer program code that can identify in the file generated by job sequencer program module 130 a stage having a stage type, and determine whether to execute the stage on one or more processors 108 or on FPGA 110, based on the stage type. Most stages within an ETL job are executed on one or more processors 108. However, if job executor program module 135 identifies a compressor stage and/or a decompressor stage within the ETL job then job executor program module 135 executes the identified compressor stage and/or decompressor stage on FPGA 110, because FPGA 110 can compress and decompress data processed by the ETL job faster than one or more processors 108. Accordingly, compressor stages and decompressor stages of an ETL job are executed on FPGA 110, but all other stages of the ETL job can be executed on one or more processors 108.

Figure 2:
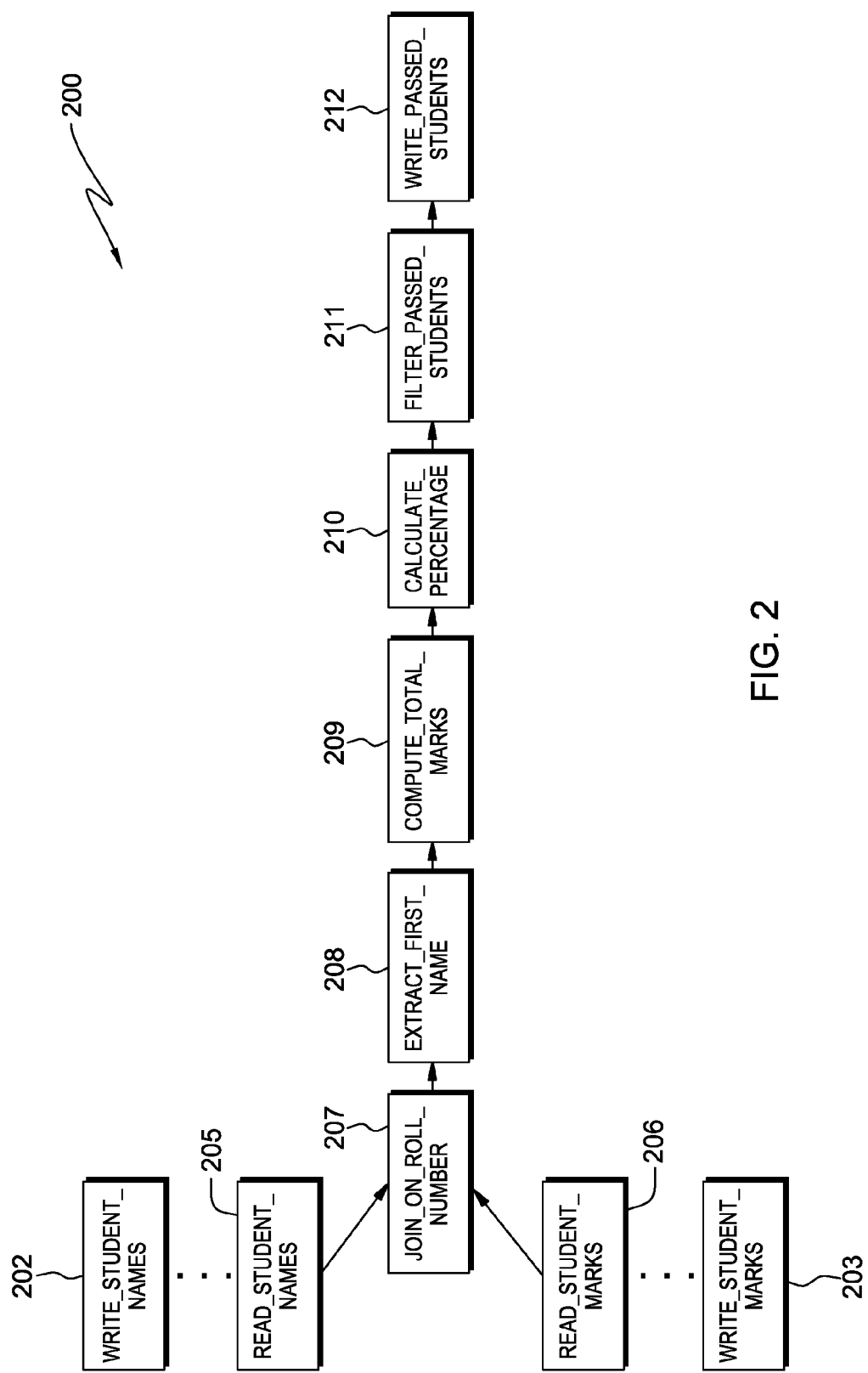
FIG. 2 is a block diagram illustrating an example of an extract, transform, and load (ETL) job having two write stages, followed by two read stages, and followed by another write stage according to an embodiment of the present invention.

FIG. 2 is a block diagram illustrating an example of ETL job 200 having multiple stages. Specifically, ETL job 200 includes the following stages: write_student_names 202, write_student_marks 203, read_student_names 205, read_student_marks 206, join_on_roll_number 207, extract_first_name 208, compute_total_marks 209, calculate_percentage 210, filter_passed_students 211, and write_passed_students 212. The stages write_student_names 202 and write_student_marks 203 are stages that have a write stage type, and write data to a target location (e.g., a file on a hard disk) wherein the target location is the source location for subsequent stages read_student_names 205 and read_student_marks 206. In the disclosed embodiment, stages write_student_names 202 and write_student_marks 203 are writing data being read by stages read_student_names 205 and read_student_marks 206 within the same ETL job 200, and data processed by these stages may be transferred via hard disk or TCP/IP. If data is transferred through hard disk, then read and write stages may be replaced as described below in more detail with respect to FIG. 3. In other embodiments, stages write_student_names 202 and write_student_marks 203 may even be in a different ETL job than stages read_student_names 205 and read_student_marks 206, and if data processed by these stages are transferred through hard disk then read and write stages may still be replaced as described below in more detail with respect to FIG. 3.

Moreover, the stages read_student_names 205 and read_student_marks 206 are read stages that have a read stage type, and read data from various source locations. The stage join_on_roll_number 207 is a join stage that has a join stage type, and combines data from the various source locations into a single database table. The stage extract_first_name 208 is an extract stage that has an extract stage type, and extracts first names from the database table. The stages compute_total_marks 209, calculate_percentage 210, and filter_passed_students 211 are compute stages that have a compute stage type, and perform mathematical calculations and/or comparisons utilizing data from the database table. The stage write_passed_students 212 is a write stage that has a write stage type, and writes data to a target location wherein the target location may be one of the source locations for a subsequent stage in the same ETL job 200 or for a stage in a subsequent job in a job sequence.

Furthermore, stages write_student_names 202 and write_student_marks 203 that each write data to the target location, and read_student_names 205 and read_student_marks 206 that each read the data from the target location can reduce performance of ETL job 200, because the stage join_on_roll_number 207 and subsequent stages up to and including filter_passed_students 211 are processing stages that are typically faster than I/O stages but may have to wait for the I/O stages (i.e., write_student_names 202, write_student_marks 203, read_student_names 205, and read_student_marks 206) to finish. Thus, to enhance the overall performance of ETL job 200, write_student_names 202 and write_student_marks 203 can each be replaced with a compressor stage, read_student_names 205 and read_student_marks 206 can each be replaced with a decompressor stage, and even write_passed_students 212 can be replaced with a compressor stage as described below in more detail with respect to FIG. 3. Specifically, a read stage and a write stage are replaced with a decompressor stage and a compressor stage respectively, if the read stage is reading data from a file (e.g., . . . /tmp/file1) wherein the data is being written to the same file by a previous write stage.

Figure 3:
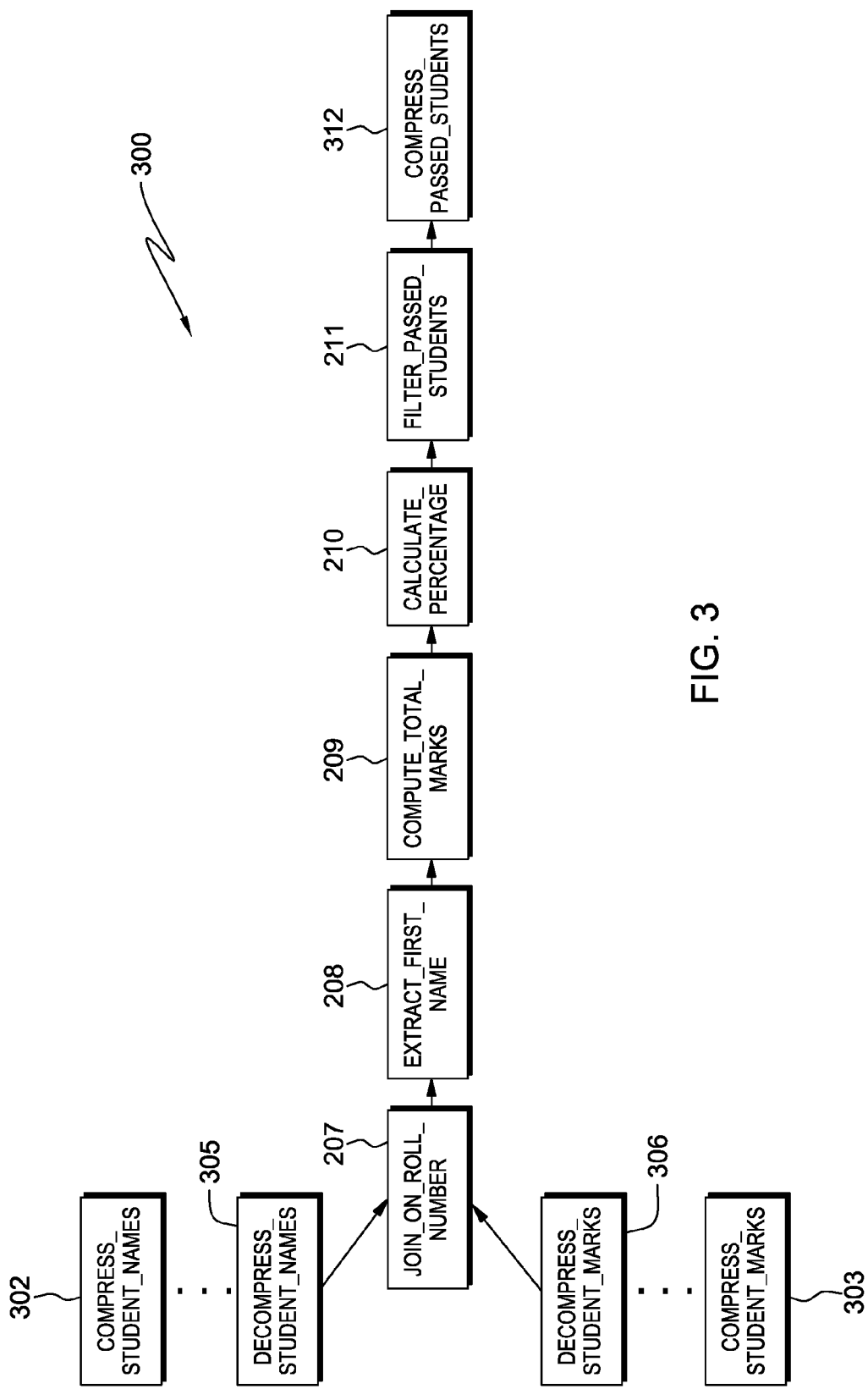
FIG. 3 is a block diagram illustrating a modified version of the ETL job of FIG. 2 wherein the two read stages are each replaced with a decompressor stage, and the three write stages are each replaced with a compressor stage in order to enhance the performance of the ETL job according to an embodiment of the present invention.

FIG. 3 is a block diagram illustrating ETL job 300, which is a modified version of ETL job 200, wherein the two read stages of ETL job 200 are each replaced with a decompressor stage, and wherein the three write stages of ETL job 200 are each replaced with a compressor stage in order to enhance the performance of the ETL job 200. Specifically, ETL job 300 includes the following stages: compress_student_names 302 (i.e., a compressor stage) which replaces write_student_names 202, compress_student_marks 303 (i.e., a compressor stage) which replaces write_student_marks 203, decompress_student_names 305 (i.e., a decompressor stage) which replaces read_student_names 205, decompress_student_marks 306 (i.e., a decompressor stage) which replaces read_student_marks 206, join_on_roll_number 207, extract_first_name 208, compute_total_marks 209, calculate_percentage 210, filter_passed_students 211, and compress_passed_students 312 (i.e., a compressor stage) which replaces write_passed_students 212. Particularly, in the disclosed embodiment, write_passed_students 212 is replaced with compress_passed_students 312, because write_passed_students 212 is writing data being read by a subsequent stage (not shown).

Thus, ETL job 300 can have enhanced performance compared to ETL job 200, because ETL job 300 is reading compressed data from a hard disk utilizing decompress_student_names 305 and decompress_student_marks 306, which is less than the amount of data to be read if the data were not compressed. Moreover, any additional performance cost due to ETL job 300 having to compress data utilizing write_passed_students 212 or having to decompress data utilizing decompress_student_names 305 and decompress_student_marks 306 is negligible, because decompressor stages and compressor stages can execute faster on FPGA 110 compared to former read stages (i.e., read_student_names 205 and read_student_marks 206) and write stage (i.e., write_passed_students 212) that execute on processors 108.

Figure 4A:
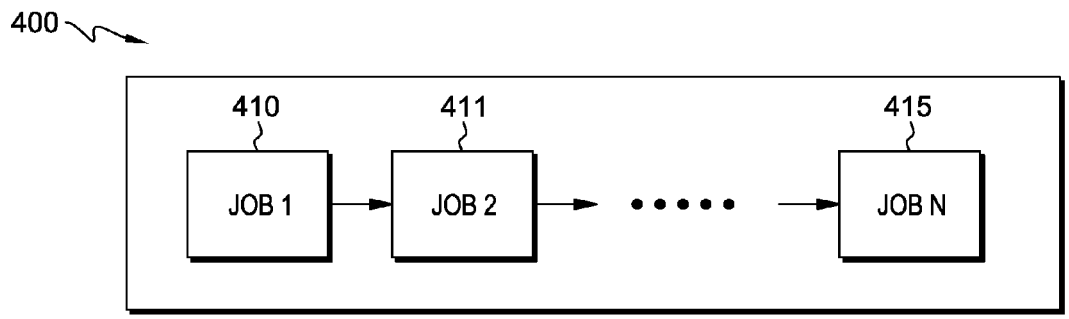
FIGS. 4A-4C are block diagrams illustrating a job sequence, a first ETL job, and a second ETL job according to an embodiment of the present invention.
Figure 4B:
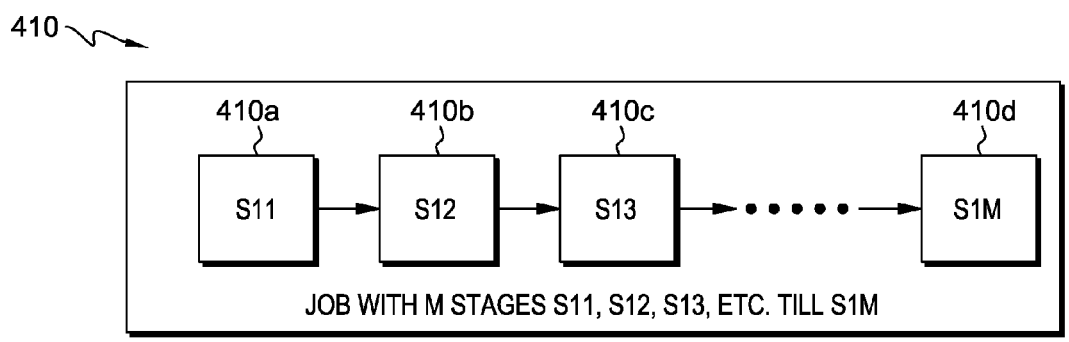
Figure 4C:
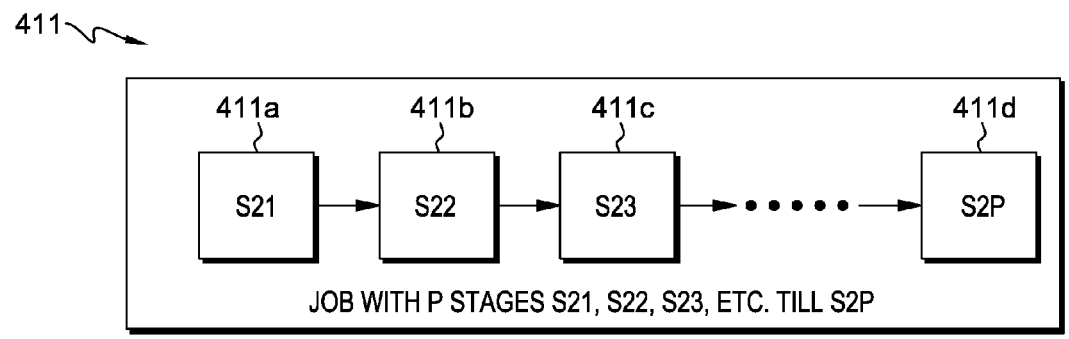

FIGS. 4A-4C are block diagrams further illustrating a job sequence 400, a first ETL job 410, and a second ETL job 411, wherein the overall performance of first ETL job 410 and/or a second ETL job 411 can be reduced as a result of bottlenecks. In the disclosed embodiment, job sequence 400 has N number of ETL jobs including first ETL job 410, second ETL job 411, . . . , and ETL job 415, wherein N ranges from one up to about one-hundred. However, in other embodiments the number of ETL jobs may be even greater than one-hundred. First ETL job 410 includes M number of stages 410a-410d, and second ETL job 411 includes P number of stages 411a-411d. The number of stages M and P can range from one up to about one-hundred. However, in other embodiments the number of stages may be even greater than one-hundred.

The performance of ETL job 410 can be reduced as a result of a bottleneck caused by data being written by a stage of ETL job 410, wherein the same or a modified of the data needs to be read by a subsequent stage within ETL job 410 or a subsequent stage within ETL job 411. For example, in the disclosed embodiment stage 410a is a write stage within ETL job 410 that is writing data to a file (e.g., . . . /tmp/file2), wherein a subsequent stage 410c within the same ETL job 410 and/or a subsequent stage 411a within ETL job 411 are reading the data from the same file (e.g., . . . /tmp/file2) which is a bottleneck. As a result, to improve overall performance of ETL jobs 410 and 411, stages 410a, 410c and/or 411a are replaced. Specifically, write stage 410a is replaced with a compressor stage, and read stages 410c and/or 41 1a are each replaced with a decompressor stage. However, in another embodiment, if stage 410a is writing to a different file than that being read by stages 410c and 411a, then stages 410a, 410c, and 411a are not replaced. In still another embodiment, if stage 410a is reading data from a file (e.g., . . . /tmp/file3), wherein a subsequent stage 410c and/or a subsequent stage 411a are writing data to the same file (e.g., . . . /tmp/file3) then stages 410a, 410c, and 411a are not replaced with compressor stages or decompressor stages.

Figure 5:
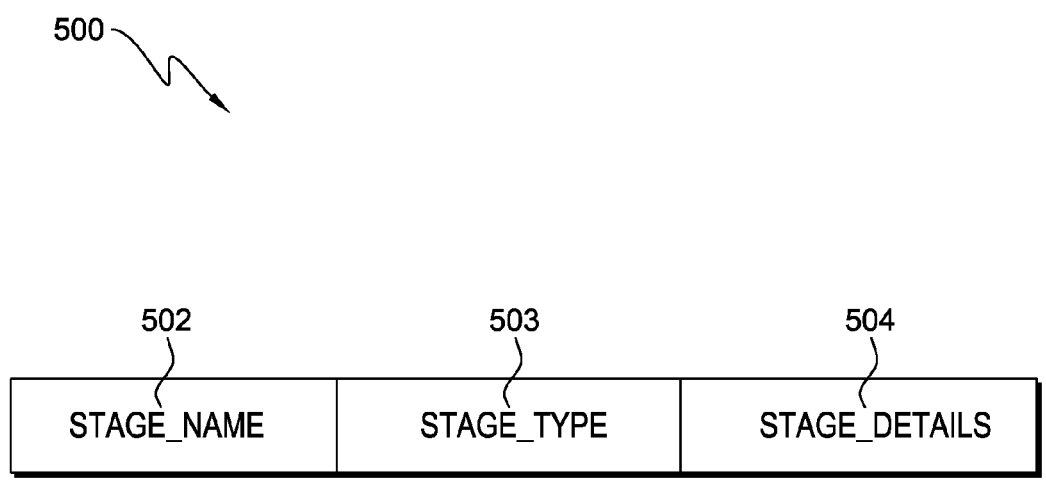
FIG. 5 is a diagram illustrating a specific format of a file having configuration information, wherein the configuration information includes data having parameters that define each stage of an ETL job, and wherein the file can be used by the computer program code to identify stages of the ETL job to replace according to an embodiment of the present invention.

FIG. 5 is a diagram illustrating a specific format of file 500 having configuration information mentioned above in regard to FIG. 1, wherein the configuration information includes data having parameters that define each stage of an ETL job, and wherein file 500 can be parsed by job optimizer program module 125 to identify stages of the ETL job to replace. In the disclosed embodiment, for each stage the specific format is parameter stage_name 502, followed by parameter stage_type 503, and followed by parameter stage_details 504. Thus, each stage of the ETL job is defined using the specific format, wherein the parameter stage_name 502 is associated with parameter stage_type 503. The parameter stage_name 502 represents a name of a stage of the ETL job, and the parameter stage_type 503 is utilized to indicate the type of operations that are performed by the stage of the ETL job. The parameter stage_details 504 can vary for each stage. Specifically, in the disclosed embodiment, for a read stage or write stage the parameter stage_ details 504 is a delimited list (e.g., a comma delimited list) of filenames used by read stages and write stages to respectively read from and write to a file named in the delimited list. The comma delimited list of filenames can be followed by additional stage information, based on the end-user's needs and/or custom design requirements for defining and executing a stage of the ETL job. Moreover, each of the parameters stage_name 502, stage_type 503, and stage_details 504 are configurable by the end-user via GUI 132. Furthermore, in other embodiments, the specific format of file 500 may have a different ordering of parameters stage_name 502, stage_type 503, and stage_details 504 than the ordering mentioned above. Also, file 500 may include additional parameters for defining a stage of the ETL job, based on design requirements.

Figure 6:
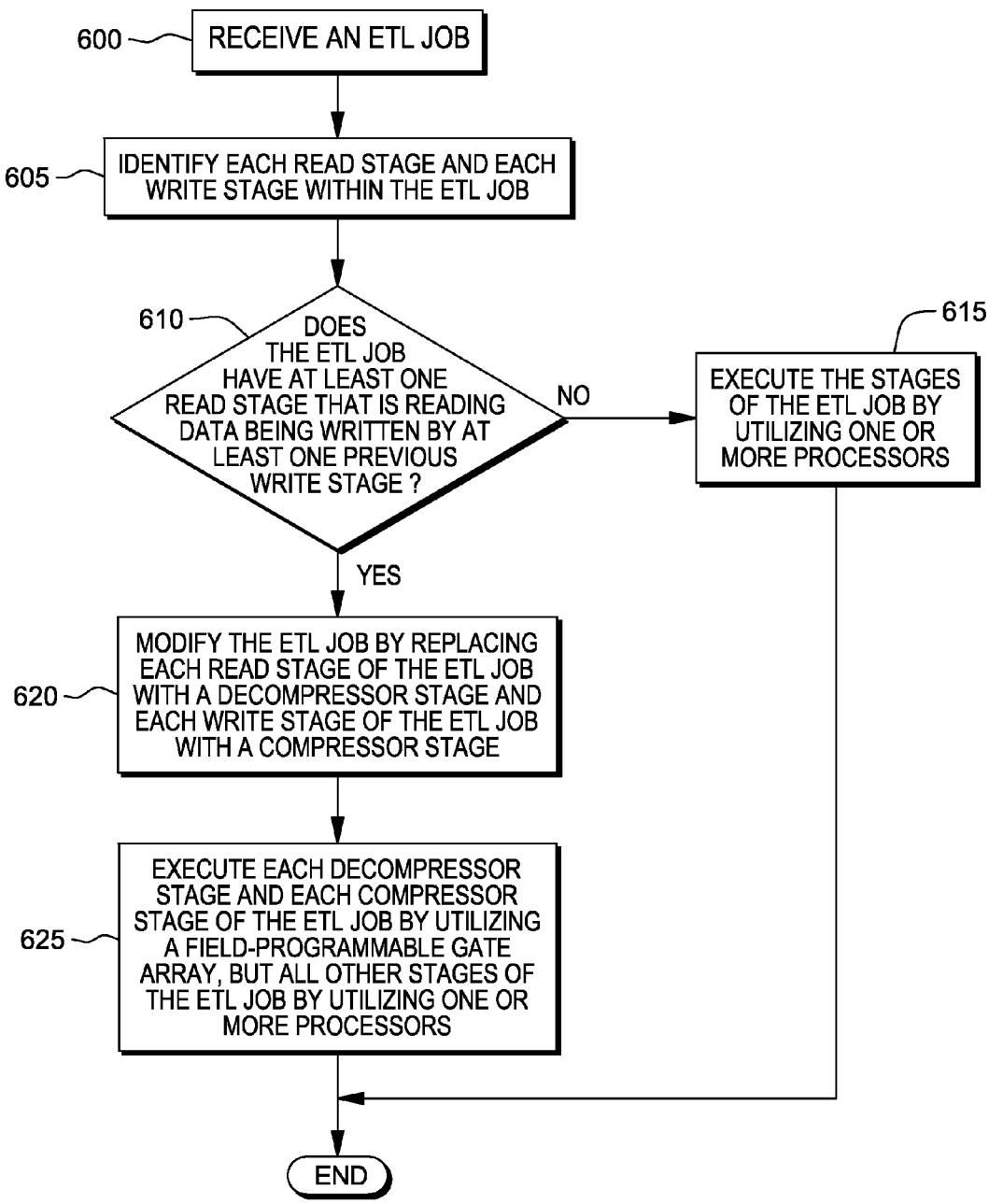
FIG. 6 is a flowchart illustrating operations of the computer program code replacing a read stage and write stage of an ETL job with a compressor stage and a decompressor stage, respectively, and utilizing the FPGA of FIG. 1 to execute the decompressor stage and the compressor stage according to an embodiment of the present invention.

FIG. 6 is a flowchart illustrating operations of computer program code replacing a read stage and write stage of an ETL job with a compressor stage and a decompressor stage, respectively, and utilizing FPGA 110 to execute the decompressor stage and the compressor stage. Specifically, the computer program code includes job optimizer program module 125 that can parse the file 500 and replace a read stage and write stage of the ETL job with a decompressor stage and a compressor stage, respectively. In addition, job optimizer program module 125 can interact with job executor program module 135 that utilizes FPGA 110 to execute the decompressor stage and the compressor stage. As mentioned above, the decompressor stage includes operations to read data from a hard disk and decompress the data into a set of rows of a database table and/or file. In addition, the decompressor stage further includes operations to send the data (i.e., pass the set of rows) to: another stage of the same ETL job, another stage of a different ETL job, job executor program module 135, or any other computer program code for further processing. The compressor stage and the decompressor stage can enhance the performance of the ETL job by executing on FPGA 110 having compression and decompression functionality.

In the disclosed embodiment job optimizer program module 125 receives an ETL job (block 600). Next, job optimizer program module 125 identifies each read stage and each write stage within the ETL job (block 605), and determines whether the ETL job has at least one read stage that is reading data being written by at least one previous write stage (decision block 610). If job optimizer program module 125 determines that the ETL job does not have at least one read stage that is reading data being written by a previous write stage (the "NO" branch of decision block 610), then job sequencer program module 130 calls job executor program module 135 to execute the stages of the ETL job by utilizing one or more processors 108 (block 615). After all stages of the ETL job are executed, further processing by job executor program module 135 ends.

However, if job optimizer program module 125 determines that the ETL job has at least one read stage that is reading data being written by at least one previous write stage (the "YES" branch of decision block 610), then job sequencer program module 130 calls job optimizer program module 125 to modify the ETL job by replacing each read stage of the ETL job with a decompressor stage and each write stage of the ETL job with a compressor stage (block 620). Subsequently, job executor program module 135 executes each decompressor stage and each compressor stage of the ETL job by utilizing FPGA 110, but all other stages of the ETL job by utilizing one or more processors 108 (block 625). After all stages of the ETL job are executed, further processing by job executor program module 135 ends.

Figure 7:
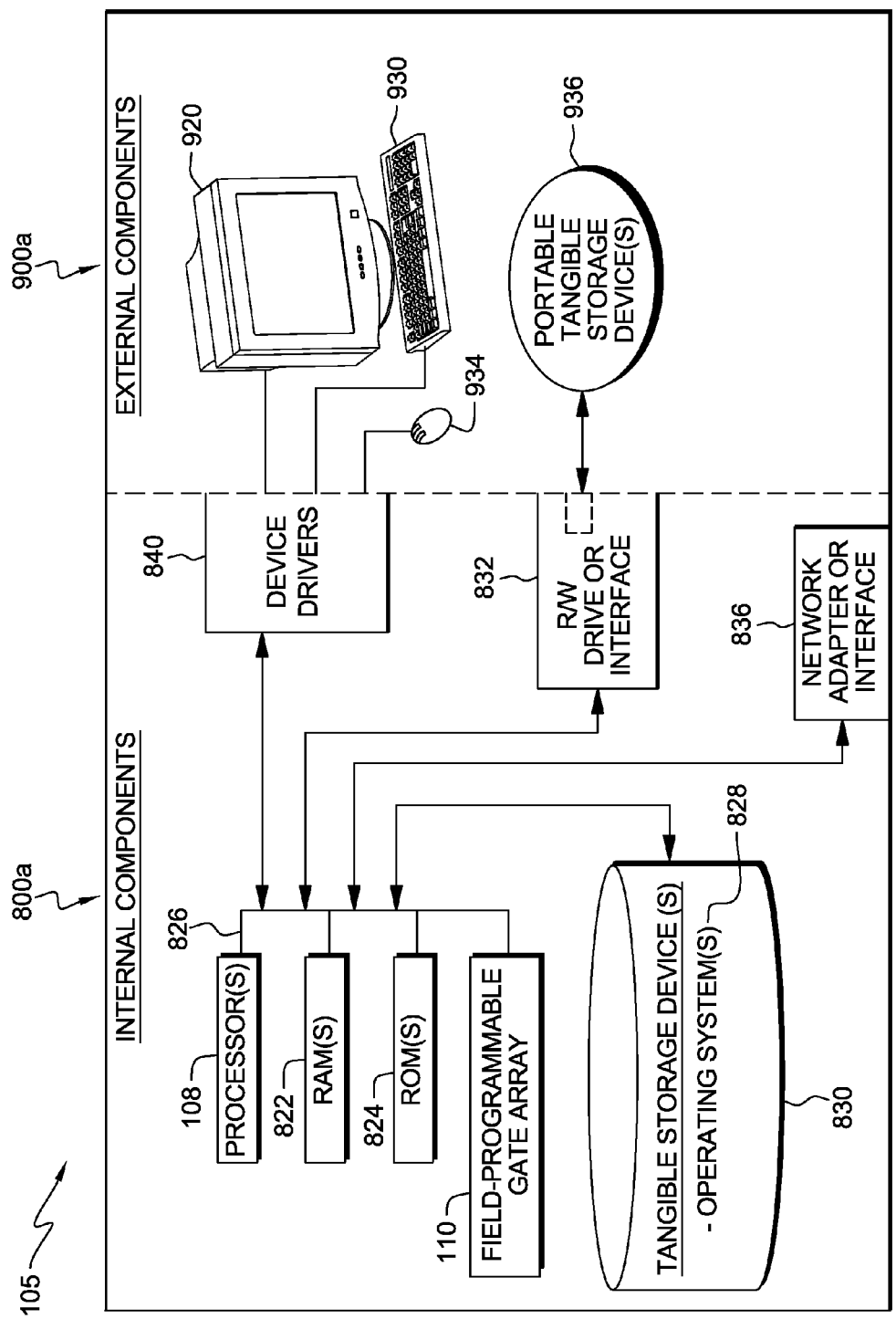
FIG. 7 is a block diagram depicting, in more detail, internal and external components of the computer of FIG. 1 according to an embodiment of the present invention.

FIG. 7 is a block diagram depicting a set of internal components 800a and a set of external components 900a that correspond to computer 105. Internal components 800a include one or more processors 108, one or more computer-readable RAMs 822, one or more computer-readable ROMs 824, and at least one FPGA 110 on one or more buses 826. Internal components 800a further include one or more operating systems 828 and one or more computer-readable tangible storage devices 830. The one or more operating systems 828, computer program code for job optimizer program module 125, and computer program code for job sequencer program module 130 that includes GUI 132 and job executor program module 135 are stored on one or more of the respective computer-readable tangible storage devices 830 for execution by one or more of the respective processors 108 via one or more of the respective RAMs 822 (which typically include cache memory). In the embodiment illustrated in FIG. 6, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

The set of internal components 800a includes a R/W drive or interface 832 to read from and write to one or more portable computer-readable tangible storage devices 936 such as CD-ROM, DVD, memory stick, magnetic tape, magnetic disk, optical disk or semiconductor storage device. Computer program code for job optimizer program module 125, and for job sequencer program module 130 that includes GUI 132 and job executor program module 135 can be stored on one or more of the respective portable computer-readable tangible storage devices 936, read via the respective R/W drive or interface 832 and loaded into the respective computer-readable tangible storage devices 830.

Furthermore, the set of internal components 800a also includes a network adapter or interface 836 such as TCP/IP adapter card, wireless wi-fi interface card, or 3G or 4G wireless interface card or other wired or wireless communication link. Computer program code for job optimizer program module 125, and for job sequencer program module 130 that includes GUI 132 and job executor program module 135 can be downloaded to respective computer 105 from an external computer or external storage device via a network (for example, the Internet, a LAN, or a WAN) and respective network adapter or interface 836. From the network adapter or interface 836, computer program code for job optimizer program module 125, and computer program code for job sequencer program module 130 that includes GUI 132 and job executor program module 135 are loaded into respective computer-readable tangible storage devices 830. The network may comprise copper wires, optical fibers, wireless transmission, routers, firewalls, switches, gateway computers and/or servers.

The set of external components 900a can include a computer display monitor 920, a keyboard 930, and a computer mouse input device 934. External components 900a can also include touch screens, virtual keyboards, touch pads, pointing devices, and other human interface devices. The set of internal components 800a also includes device drivers 840 to interface to computer display monitor 920, keyboard 930 and computer mouse input device 934. The device drivers 840, R/W drive or interface 832 and network adapter or interface 836 comprise hardware and software in which the software is stored in computer-readable tangible storage device 830 and/or ROM 824.

It should be appreciated that FIG. 7 provides only an illustration of one implementation and does not imply any limitations with regard to the environments in which different embodiments may be implemented. A variety of modifications to the depicted environments may be implemented. Moreover, a variety of modifications to the depicted environments may be made based on design and implementation requirements.

In accordance with the foregoing, a method, a computer system, and a computer program product have been disclosed for accelerating a read stage and a write stage of an ETL job. However, numerous modifications substitutions can be made without deviating from the scope of an embodiment of the invention. Therefore, one or more embodiments of the invention have been disclosed by way of example and not limitation.

What is claimed is:

1. A computer program product for accelerating a read stage and a write stage of an extract, transform, load job comprising:
   a computer readable hardware storage medium and program instructions stored on the computer readable hardware storage medium, the program instructions comprising:
   program instructions to receive a file having configuration information that includes data that defines a plurality of stages of at least one extract, transform, and load (ETL) job;
   program instructions to create a configuration file, wherein the configuration file is associated with the file, and wherein the configuration file includes one or more compression parameters, and wherein each compression parameter of the one or more compression parameters is selected from the group consisting of a compressor stage or a decompressor stage;
   program instructions to identify a read stage that is preceded by a write stage within the file, wherein the read stage reads data from a source location, and wherein the data that is read or a modified version of the data that is read is being written by the write stage that writes data to the source location, and wherein the read stage and write stage each have a first parameter that represents a name of a stage, and wherein the first parameter is associated with a second parameter that represents a type of stage;
   program instructions to add the identified read stage to the configuration file;
   program instructions, in response to identifying the read stage that is preceded by the write stage within the file, to replace the read stage, with a decompressor stage that reads data from a hard disk, decompress the data from the hard disk and passes the data that is decompressed to another stage or to a computer program for further processing, wherein the decompressor stage is configured to be executed on a field-programmable gate array (FPGA), and wherein parameters for the read stage are a decompressor stage in the configuration file;
   program instructions, in response to identifying the read stage that is preceded by the write stage within the file, to replace the write stage, with a compressor stage that compresses the data, and writes the data to a hard disk, wherein the compressor stage is configured to be executed on the FPGA, and wherein the parameters for the write stage are a compressor stage in the configuration file;
   program instructions to receive one or more first indications from a user, wherein each first indication of the one or more first indications includes adding, modifying, or deleting a first stage of the plurality of stages;
   program instructions to receive one or more second indications from the user, wherein each second indication of the one or more second indications include one or more parameters of a second stage of the plurality of stages in the configuration file; and
   program instructions to execute the decompressor stage and the compressor stage on the FPGA based on the configuration file.

2. The computer program product of claim 1, wherein the data that defines the plurality of stages is in a format that allows for parsing of the file.

3. The computer program product of claim 2, wherein the format is a stage name parameter that defines a name of a stage, followed by a stage type parameter that defines types of operations performed by the stage, followed by a list of filenames and additional stage information needed to execute a stage of the at least one ETL job.

4. The computer program product of claim 1, wherein the type of stage comprises a read stage type that is associated with data read operations, a write stage type that is associated with data write operations, a join stage type that is associated with database join operations, an extract stage type that is associated with database extract operations, or a compute stage type that is associated with data compute operations and data comparison operations.

5. The computer program product of claim 1, wherein identifying the read stage and the write stage is based on parsing the file for the first parameter and the second parameter, and utilizing the second parameter to determine whether the stage is a read stage or write stage.

6. The computer program product of claim 1, wherein the FPGA is programmatically customized with data compression and data decompression functionality.

7. The computer program product of claim 1, wherein the decompressor stage comprises instructions to read the data from the source location, decompress the data, pass the data that is decompressed to one of: another stage ETL job or to another computer program code for further processing.

8. The computer program product of claim 1, wherein the compressor stage comprises instructions to read the data from the source location, buffer the data, and write the data to the source location.

9. A computer system for acceleration a read stage and a write stage of an extract, transform, and load job comprising:

one or more processors, one or more computer readable memories, one or more computer readable storage media and program instructions stored on the one or more storage media for execution by the one or more processors via the one or more memories, the program instructions comprising:

program instructions to receive a file having configuration information that includes data that defines a plurality of stages of at least one extract, transform, and load (ETL) job;

program instructions to create a configuration file, wherein the configuration file is associated with the file, and wherein the configuration file includes one or more compression parameters, and wherein each compression parameter of the one or more compression parameters is selected from the group consisting of a compressor stage or a decompressor stage;

program instructions to identify a read stage that is preceded by a write stage within the file, wherein the read stage reads data from a source location, and wherein the data that is read or a modified version of the data that is read is being written by the write stage that writes data to the source location, and wherein the read stage and write stage each have a first parameter that represents a name of a stage, and wherein the first parameter is associated with a second parameter that represents a type of stage;

program instructions to add the identified read stage to the configuration file;

program instructions, in response to identifying the read stage that is preceded by the write stage within the file, to replace the read stage, with a decompressor stage that reads data from a hard disk, decompress the data from the hard disk and passes the data that is decompressed to another stage or to a computer program for further processing, wherein the decompressor stage is configured to be executed on a field-programmable gate array (FPGA), and wherein parameters for the read stage are a decompressor stage in the configuration file;

program instructions, in response to identifying the read stage that is preceded by the write stage within the file, to replace the write stage, with a compressor stage that compresses the data, and writes the data to a hard disk, wherein the compressor stage is configured to be executed on the FPGA, and wherein the parameters for the write stage are a compressor stage in the configuration file;

program instructions to receive one or more first indications from a user, wherein each first indication of the one or more first indications includes adding, modifying, or deleting a first stage of the plurality of stages;

program instructions to receive one or more second indications from the user, wherein each second indication of the one or more second indications include one or more parameters of a second stage of the plurality of stages in the configuration file; and program instructions to execute the decompressor stage and the compressor stage on the FPGA based on the configuration file.

10. The computer system of claim 9, wherein the data that defines the plurality of stages is in a format that allows for parsing of the one or more files.

11. The computer system of claim 10, wherein the format is a stage name parameter that defines a name of a stage, followed by a stage type parameter that defines types of operations performed by the stage, followed by a list of filenames and additional stage information needed to execute a stage of the at least one ETL job.

12. The computer system of claim 9, wherein the type of stage comprises a read stage type that is associated with data read operations, a write stage type that is associated with data write operations, a join stage type that is associated with database join operations, an extract stage type that is associated with database extract operations, or a compute stage type that is associated with data compute operations and data comparison operations.

13. The computer system of claim 9, wherein identifying the read stage and the write stage is based on parsing the one or more files for the first parameter and the second parameter, and utilizing the second parameter to determine whether the stage is a read stage or write stage.

14. The computer system of claim 9, wherein the FPGA is programmatically customized with data compression and data decompression functionality.

15. The computer system of claim 9, wherein the decompressor stage comprises instructions to read the data from the source location, decompress the data, pass the data that is decompressed to one of: another stage ETL job or to another computer program code for further processing.

16. The computer system of claim 9, wherein the compressor stage comprises instructions to read the data from the source location, buffer the data, and write the data to the source location.

* * * * *